(12) United States Patent
Sakai et al.

(10) Patent No.: US 12,006,420 B2
(45) Date of Patent: Jun. 11, 2024

(54) POLYIMIDE POWDER COMPOSITION

(71) Applicant: MITSUBISHI GAS CHEMICAL COMPANY, INC., Chiyoda-ku (JP)

(72) Inventors: Atsushi Sakai, Kanagawa (JP); Yuuki Sato, Kanagawa (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 839 days.

(21) Appl. No.: 17/049,484

(22) PCT Filed: May 8, 2019

(86) PCT No.: PCT/JP2019/018367
§ 371 (c)(1),
(2) Date: Oct. 21, 2020

(87) PCT Pub. No.: WO2019/220967
PCT Pub. Date: Nov. 21, 2019

(65) Prior Publication Data
US 2021/0261756 A1    Aug. 26, 2021

(30) Foreign Application Priority Data
May 17, 2018  (JP) .................................. 2018-095746

(51) Int. Cl.
C08K 9/06        (2006.01)
B33Y 70/10       (2020.01)
C08K 3/36        (2006.01)

(52) U.S. Cl.
CPC ................ *C08K 9/06* (2013.01); *B33Y 70/10* (2020.01); *C08K 3/36* (2013.01); *C08K 2201/005* (2013.01); *C08K 2201/011* (2013.01)

(58) Field of Classification Search
CPC ....................................................... C08K 9/06
See application file for complete search history.

(56) References Cited

U.S. PATENT DOCUMENTS

| 2015/0225523 A1 | 8/2015 | Suenaga et al. |
| 2016/0177062 A1 | 6/2016 | Sato et al. |
| 2017/0130003 A1 | 5/2017 | Sato |
| 2017/0275425 A1 | 9/2017 | Sato |

FOREIGN PATENT DOCUMENTS

| CN | 104704057 A  |   | 6/2015  |
| CN | 103732688 B  | * | 12/2016 |
| CN | 106536598 A  |   | 3/2017  |
| JP | 2004182850 A | * | 7/2004  |
| JP | 2007-90770 A |   | 4/2007  |
| JP | 2012-21 4697 A |  | 11/2012 |

(Continued)

OTHER PUBLICATIONS

International Search Report dated Aug. 13, 2019 in PCT/JP2019/018367 filed on May 8, 2019, 1 page.

(Continued)

*Primary Examiner* — Tae H Yoon
(74) *Attorney, Agent, or Firm* — Oblon, McClelland, Maier & Neustadt, L.L.P.

(57) ABSTRACT

Provided is a polyimide powder composition containing a thermoplastic polyimide resin powder (A) and silica particles (B) having a volume average particle size D50 of 90 nm or less.

9 Claims, 1 Drawing Sheet

(56) References Cited

FOREIGN PATENT DOCUMENTS

| JP | 2015-30826 A | 2/2015 |
| WO | WO 2015/020020 A1 | 2/2015 |
| WO | WO 2017/040897 A1 | 3/2017 |

OTHER PUBLICATIONS

Chen, "Introduction to Advanced Composite Materials Technology", Aviation Industry Press, 2017, 3 pages.

Cheng et al., "Raw Materials and Technology of Composite Materials", Northwestern Polytechnical University Press, 2018, 3 pages.

* cited by examiner

POLYIMIDE POWDER COMPOSITION

CROSS-REFERENCE TO RELATED APPLICATIONS

The present application is a 35 U.S.C. § 371 national stage patent application of International patent application PCT/JP2019/018367, filed on May 8, 2019, which is based on and claims the benefits of priority to Japanese Application No. 2018-095746, filed on May 17, 2018.

TECHNICAL FIELD

The present invention relates to a polyimide powder composition.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide resin having crystallinity is further enhanced in the heat resistance, the strength and the chemical resistance thereof, and thus is expected for applications as alternatives of metals or the like. While a polyimide resin has high heat resistance, however, it has the problems of exhibiting no thermoplasticity and having low molding processability.

3D printer techniques recently have attracted attention as techniques for shaping three-dimensional stereoscopic objects. For example, attempts have been made for applying a thermoplastic resin powder in molding materials for powder-sintering type 3D printers. A powder sintering method is a method for producing a three-dimensional stereoscopic object by sequentially repeating a thin-film formation step of extending a powder into a thin film and a cross-sectional shape formation step of irradiating the formed thin film with laser light in a shape corresponding to the cross-sectional shape of a shaped object, thereby binding the powder.

Molding materials for powder sintering-type 3D printers are required to be powder materials having high flowability in consideration of obtaining excellent shape reproducibility. It is preferable that such materials require no high temperature conditions and the like on molding and be easily molding-processed, in consideration of productivity of a molded article.

PLT 1 discloses, as a polyimide powder composition having high flowability and a high packing property even when packed in a mold in the case of continuous molding with a continuous powder molding apparatus, a polyimide powder composition being a polyimide powder onto the surface of which silica particulates are attached, the silica particulates being produced by a predetermined production process and having a specific shape.

CITATION LIST

Patent Literature

PTL 1: JP-A-2015-30826

SUMMARY OF INVENTION

Technical Problem

However, the polyimide powder composition of PTL 1 is molded principally by a heating pressurization method or the like. The polyimide powder disclosed in PTL 1 is an aromatic polyimide powder obtained by reacting an aromatic tetracarboxylic dianhydride with an aromatic diamine. Thus, the polyimide powder exhibits no thermoplasticity, and has low molding processability because molding processing thereon usually requires molding under a high-temperature and high-pressure condition for a long period.

An object of the present invention is to provide a polyimide powder composition suitable as a material for powder sintering-type three-dimensional shaping, having good flowability, and being easily molding-processed.

Solution to Problem

The present inventors have found that the aforementioned object can be attained by a polyimide powder composition containing a thermoplastic polyimide resin powder and silica particles having an average particle size in a predetermined range.

That is, the present invention provides a polyimide powder composition containing a thermoplastic polyimide resin powder (A) and silica particles (B) having a volume average particle size D50 of 90 nm or less.

Advantageous Effects of Invention

The polyimide powder composition of the present invention has high flowability. Thus, even when used for powder sintering-type three-dimensional shaping, the polyimide powder composition has good shape reproducibility and is also excellent in productivity because of having good molding processability. The polyimide powder composition is suitable as, for example, a material for three-dimensional shaping such as a molding material for powder sintering-type 3D printers, and additionally, a matrix resin material for a fiber-reinforced composite such as a carbon fiber-reinforced thermoplastic resin (CFRTP).

DESCRIPTION OF EMBODIMENTS

[Polyimide Powder Composition]

Figure 1:
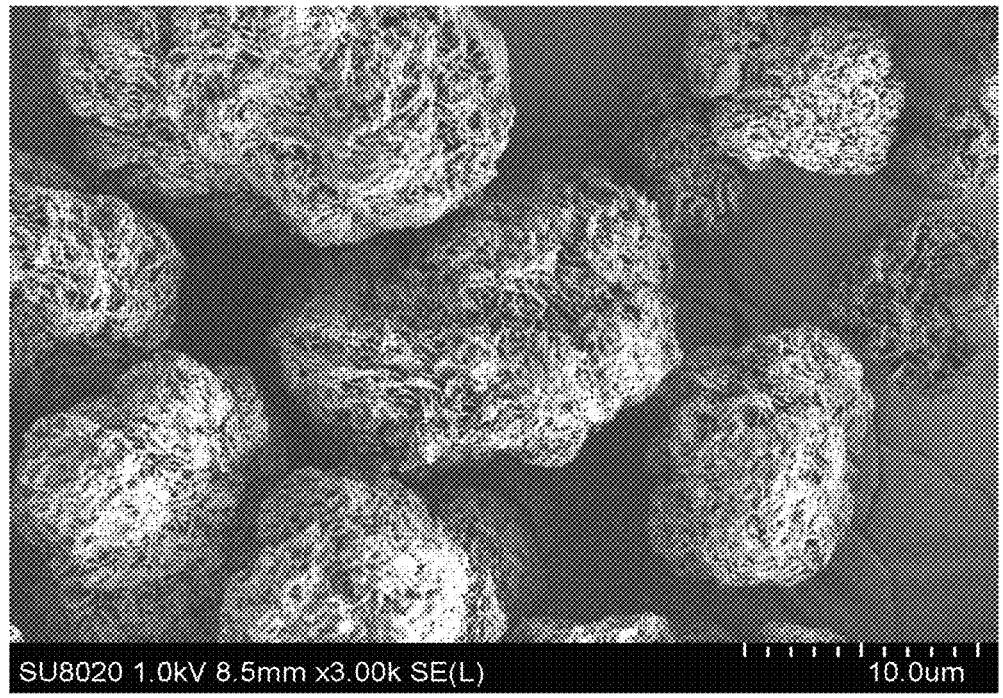
FIG. 1 is an image of a polyimide resin powder 1 obtained in Production Example 1, which image is obtained under observation with a scanning electron microscope.

The polyimide powder composition of the present invention is characterized by containing a thermoplastic polyimide resin powder (A) and silica particles (B) having a volume average particle size D50 of 90 nm or less.

The polyimide powder composition of the present invention does not require to be molded under a high-temperature and high-pressure condition for a long period because of containing the thermoplastic polyimide resin powder (A), having good molding processability. Combining the thermoplastic polyimide resin powder (A) and silica particles (B) having a volume average particle size D50 equal to or less than a predetermined value makes the flowability good, and enables a polyimide powder composition to be provided, the composition being suitable as a material for three-dimensional shaping such as a molding material for powder sintering-type 3D printers and a matrix resin material for a fiber-reinforced composite such as a carbon fiber-reinforced thermoplastic resin (CFRTP).

According to the disclosure of Examples of PTL 1 (particularly, paragraphs 0063, 0087 to 0089), with respect to the polyimide powder composition described in Examples of PTL 1, in the case where the particle size of the silica particulates to be used exceeds 100 nm (115 nm, 238 nm), the basic flowability energy of the polyimide powder composition becomes lower than, that is, the flowability thereof is better than, that in the case where the particle size of the silica particulates to be used is as small as 100 nm or less (11 nm, 52 nm). The polyimide powder used in Examples of PTL 1 is an aromatic polyimide powder obtained by reacting an aromatic tetracarboxylic dianhydride with an aromatic diamine, and the composition is molded at room temperature and a molding pressure of 5000 kgf/cm², thereby being expected to exhibit no thermoplasticity.

However, in contrast to the above, the present inventors have found that combining silica particles having a smaller volume average particle size D50 of 90 nm or less with the thermoplastic polyimide resin powder (A) to be used in the polyimide powder composition of the present invention more improves the flowability of the powder composition.

The details of the components to be used in the polyimide powder composition of the present invention will be described below.

<Thermoplastic Polyimide Resin Powder (A)>

As the polyimide powder composition of the present invention, a thermoplastic polyimide resin powder (A) (hereinafter, also simply referred to as the "polyimide resin powder") in consideration of obtaining a powder composition that is easily molding-processed.

The polyimide resin constituting the thermoplastic polyimide resin powder (A) is not particularly limited as long as the polyimide resin exhibits thermoplasticity, and any of an aromatic polyimide resin, an aliphatic polyimide resin, and a semi-aromatic polyimide resin can be used. As the degree of the thermoplasticity, it is preferable that the polyimide resin have a melting point of 360° C. or less, specifically. The melting point of the polyimide resin will be mentioned later.

The polyimide resin constituting the thermoplastic polyimide resin powder (A) is preferably a polyimide resin containing a repeating structural unit represented by the following formula (1) and a repeating structural unit represented by the following formula (2), the content ratio of the repeating structural unit of the formula (1) with respect to the total of the repeating structural unit of the formula (1) and the repeating structural unit of the formula (2) being 20 to 70 mol %, in consideration that molding processability and heat resistance are both achieved:

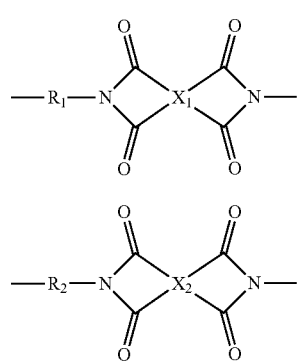

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

The polyimide resin is a thermoplastic resin which is in a form of powder. The polyimide resin is distinguished from, for example, polyimide resins formed by closing the imide ring after shaping in a state of a polyimide precursor such as a polyamic acid and having no glass transition temperature (Tg), or polyimide resins that decompose at a temperature lower than the glass transition temperature.

The repeating structural unit of formula (1) will be described in detail below.

$R_1$ represents a divalent group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

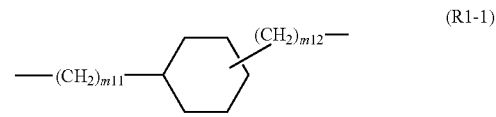

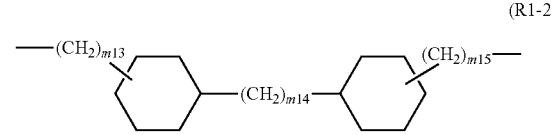

wherein $m_{11}$ and $m_{12}$ each independently represent an integer of 0-2, and preferably 0 or 1; and $m_{13}$ to $m_{15}$ each independently represent an integer of 0-2, and preferably 0 or 1.

$R_1$ is particularly preferably a divalent group represented by the following formula ($R_1$-3):

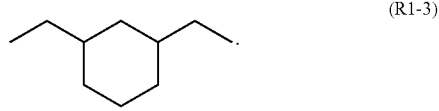

In the divalent group represented by the formula ($R_1$-3), the conformation of the two methylene groups with respect to the cyclohexane ring may be either cis or trans, and the ratio of cis and trans may be an arbitrary value.

$X_1$ is a tetravalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4):

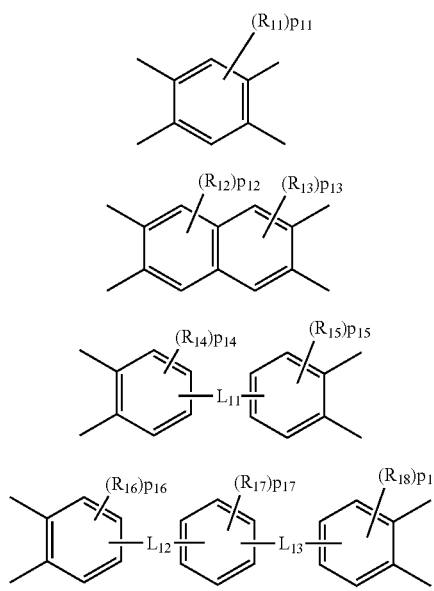

wherein $R_{11}$ to $R_{18}$ each independently represent an alkyl group having from 1 to 4 carbon atoms; $p_{11}$ to $p_{13}$ each independently represent an integer of 0-2, and preferably 0; $p_{14}$, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having from 1 to 4 carbon atoms.

$X_1$ is a tetravalent group having from 6 to 22 carbon atoms containing at least one aromatic ring, and therefore $R_{12}$, $R_{13}$, $p_{12}$ and $p_{13}$ in the formula (X-2) are selected in such a manner that the tetravalent group represented by the formula (X-2) has from 10 to 22 carbon atoms.

Similarly, $L_{11}$, $R_{14}$, $R_{15}$, $p_{14}$ and $p_{15}$ in the formula (X-3) are selected in such a manner that the tetravalent group represented by the formula (X-3) has from 12 to 22 carbon atoms, and $L_{12}$, $L_{13}$, $R_{16}$, $R_{17}$, $R_{18}$, $p_{16}$, $p_{17}$ and $p_{18}$ in the formula (X-4) are selected in such a manner that the tetravalent group represented by the formula (X-4) has from 18 to 22 carbon atoms.

$X_1$ is particularly preferably a tetravalent group represented by the following formula (X-5) or (X-6):

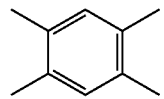

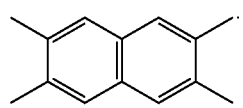

Next, the repeating structural unit of formula (2) will be described in detail below.

$R_2$ represents a divalent chain aliphatic group having from 5 to 16 carbon atoms, preferably from 6 to 14 carbon atoms, more preferably from 7 to 12 carbon atoms, and further preferably from 8 to 10 carbon atoms. The chain aliphatic group herein means a group derived from a chain aliphatic compound, and the chain aliphatic compound may be either saturated or unsaturated, may be in the form of either linear or branched chain, and may contain a hetero atom, such as an oxygen atom.

$R_2$ is preferably an alkylene group having from 5 to 16 carbon atoms, more preferably an alkylene group having from 6 to 14 carbon atoms, further preferably an alkylene group having from 7 to 12 carbon atoms, and particularly preferably an alkylene group having from 8 to 10 carbon atoms. The alkylene group may be either a linear alkylene group or a branched alkylene group, and is preferably a linear alkylene group.

$R_2$ preferably represents at least one selected from the group consisting of an octamethylene group and a decamethylene group, and particularly preferably represents an octamethylene group.

Another preferred embodiment of $R_2$ is a divalent chain aliphatic group having from 5 to 16 carbon atoms containing an ether group. The divalent chain aliphatic group preferably has from 6 to 14 carbon atoms, more preferably from 7 to 12 carbon atoms, and further preferably from 8 to 10 carbon atoms. Preferred examples of the group include a divalent group represented by the following formula (R2-1) or (R2-2):

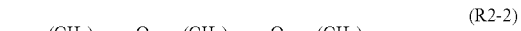

wherein $m_{21}$ and $m_{22}$ each independently represent an integer of 1-15, preferably 1-13, more preferably 1-11, and further preferably 1-9; and $m_{23}$ to $m_{25}$ each independently represent an integer of 1-14, preferably 1-12, more preferably 1-10, and further preferably 1-8.

$R_2$ represents a divalent chain aliphatic group having from 5 to 16 carbon atoms (preferably from 6 to 14 carbon atoms, more preferably from 7 to 12 carbon atoms, and further preferably from 8 to 10 carbon atoms), and therefore $m_{21}$ and $m_{22}$ in the formula (R2-1) are selected so that the divalent group represented by the formula (R2-1) has from 5 to 16 carbon atoms (preferably from 6 to 14 carbon atoms, more preferably from 7 to 12 carbon atoms, and further preferably from 8 to 10 carbon atoms), i.e., $m_{21}+m_{22}$ is from 5 to 16 (preferably 6 to 14, more preferably 7 to 12, and further preferably 8 to 10).

Similarly, $m_{23}$ to $m_{25}$ in the formula (R2-2) are selected so that the divalent group represented by the formula (R2-2) has from 5 to 16 carbon atoms (preferably from 6 to 14 carbon atoms, more preferably from 7 to 12 carbon atoms, and further preferably from 8 to 10 carbon atoms), i.e., $m_{23}+m_{24}+m_{25}$ is from 5 to 16 (preferably from 6 to 14 carbon atoms, more preferably from 7 to 12 carbon atoms, and further preferably from 8 to 10 carbon atoms).

$X_2$ is defined similarly to $X_1$ in the formula (1), and preferred embodiments thereof are also the same.

The content ratio of the repeating structural unit of the formula (1) with respect to the total of the repeating structural unit of the formula (1) and the repeating structural unit of the formula (2) is preferably 20 mol % to 70 mol %. In the case where the content ratio of the repeating structural unit of the formula (1) is in the above range, the polyimide resin may also be sufficiently crystallized in an ordinary injection molding cycle. When the content ratio is 20 mol % or more, molding processability is good, and when the content ratio is 70 mol % or less, good heat resistance can be maintained.

The content ratio of the repeating structural unit of the formula (1) with respect to the total of the repeating structural unit of the formula (1) and the repeating structural unit of the formula (2) is preferably 65 mol % or less, more preferably 60 mol % or less, and further preferably 50 mol % or less in consideration of exerting high crystallinity.

Among these, the content ratio of the repeating structural unit of the formula (1) with respect to the total of the repeating structural unit of the formula (1) and the repeating structural unit of the formula (2) is preferably 20 mol % or more and less than 40 mol %. When the content ratio falls within this range, the crystallinity of the polyimide resin increases, and thus a polyimide powder composition more excellent in heat resistance can be obtained.

The content ratio described above is more preferably 25 mol % or more, further preferably 30 mol % or more, still further preferably 32 mol % or more in consideration of molding processability, and is still further preferably 35 mol % or less in consideration of exerting high crystallinity.

The content ratio of the total of the repeating structural unit of the formula (1) and the repeating structural unit of the formula (2) with respect to the total repeating structural units constituting the polyimide resin is preferably 50 to 100 mol %, more preferably 75 to 100 mol %, further preferably 80 to 100 mol %, and still further preferably 85 to 100 mol %.

The polyimide resin may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 10 mol % or more, in consideration of enhancement of the heat resistance, and is preferably 20 mol % or less, and more preferably 15 mol % or less, in consideration of maintenance of the crystallinity.

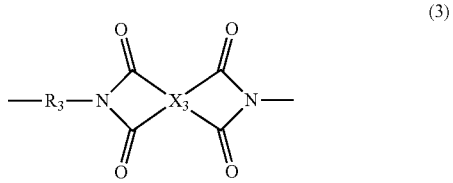

(3)

wherein $R_3$ represents a divalent group having from 6 to 22 carbon atoms containing at least one aromatic ring; and $X_3$ represents a tetravalent group having from 6 to 22 carbon atoms containing at least one aromatic ring.

$R_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

$R_3$ contains at least one aromatic ring, and preferably contains from 1 to 3 aromatic rings.

The aromatic ring may also be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups such as alkylene fluoride groups (e.g., —C(CF$_3$)$_2$— and —(CF$_2$)$_p$— (wherein p is an integer of 1-10), as well as —CO—, —SO$_2$—, —SO—, —CONH—, and —COO—.

$R_3$ is preferably a divalent group represented by the following formula (R3-1) or (R3-2):

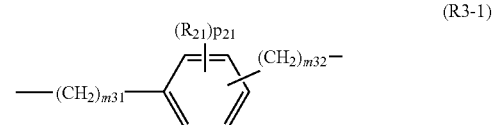

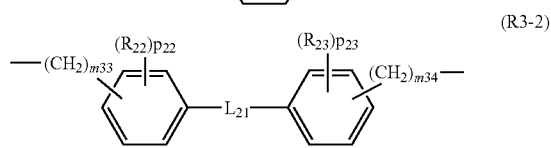

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of 0-4, and preferably 0; and $L_{21}$ represents a single bond, an ether group, a carbonyl group or an alkylene group having from 1 to 4 carbon atoms.

$R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.

$X_3$ is defined similarly to $X_1$ in the formula (1), and preferred embodiments thereof are also the same.

The polyimide resin may further contain a repeating structural unit represented by the following formula (4):

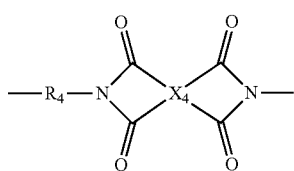

(4)

wherein $R_4$ represents a divalent group containing —$SO_2$— or —$Si(R_x)(R_y)O$—; $R_x$ and $R_y$ each independently represent a chain aliphatic group having from 1 to 3 carbon atoms, or a phenyl group; and $X_4$ represents a tetravalent group having from 6 to 22 carbon atoms containing at least one aromatic ring.

$X_4$ is defined similarly to $X_1$ in the formula (1), and preferred embodiments thereof are also the same.

The end structure of the polyimide resin is not particularly limited, and preferably has a chain aliphatic group having 5 to 14 carbon atoms at the end thereof.

The chain aliphatic group may be either saturated or unsaturated, and may be in the form of either linear or branched chain. When the polyimide resin contains the above particular group at the end thereof, it is possible to obtain a polyimide powder composition excellent in heat aging resistance.

Example of the saturated chain aliphatic group having from 5 to 14 carbon atoms include an n-pentyl group, an n-hexyl group, an n-heptyl group, an n-octyl group, an n-nonyl group, an n-decyl group, an n-undecyl group, a lauryl group, an n-tridecyl group, an n-tetradecyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, an isododecyl group, an isotridecyl group and an isotetradecyl group.

Example of the unsaturated chain aliphatic group having from 5 to 14 carbon atoms include a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, a dodecenyl group, a tridecenyl group and a tetradecenyl group.

Among these, the chain aliphatic group is preferably a saturated chain aliphatic group, and more preferably a saturated linear aliphatic group. The chain aliphatic group preferably has 6 or more carbon atoms, more preferably 7 or more carbon atoms and further preferably 8 or more carbon atoms, and preferably has 12 or less carbon atoms, more preferably 10 or less carbon atoms and further preferably 9 or less carbon atoms in consideration of achievement of heat aging resistance. The chain aliphatic group may be adopted singly or in combinations of two or more.

The chain aliphatic group is particularly preferably at least one selected from the group consisting of an n-octyl group, an isooctyl group, a 2-ethylhexyl group, an n-nonyl group, an isononyl group, an n-decyl group and an isodecyl group, further preferably at least one selected from the group consisting of an n-octyl group, an isooctyl group, a 2-ethylhexyl group, an n-nonyl group, and an isononyl group, and most preferably at least one selected from the group consisting of an n-octyl group, an isooctyl group, and a 2-ethylhexyl group.

The polyimide resin preferably contains only a chain aliphatic group having from 5 to 14 carbon atoms, besides a terminal amino group and a terminal carboxy group, at the end thereof in consideration of heat aging resistance. When a group, besides the above groups, is contained at the end, the content thereof with respect to the chain aliphatic group having from 5 to 14 carbon atoms is preferably 10 mol % or less and more preferably 5 mol % or less.

The content of the chain aliphatic group having from 5 to 14 carbon atoms in the polyimide resin is preferably 0.01 mol % or more, more preferably 0.1 mol % or more, and further preferably 0.2 mol % or more based on the total 100 mol % of the total repeating structural units constituting the polyimide resin in consideration of exerting excellent heat aging resistance. In order that a sufficient molecular weight is ensured and good mechanical properties are achieved, the content of the chain aliphatic group having from 5 to 14 carbon atoms in the polyimide resin is preferably 10 mol % or less, more preferably 6 mol % or less and further preferably 3.5 mol % or less based on the total 100 mol % of the total repeating structural units constituting the polyimide resin.

The content of the chain aliphatic group having from 5 to 14 carbon atoms in the polyimide resin can be determined by depolymerization of the polyimide resin.

The polyimide resin preferably has a melting point of 360° C. or less and a glass transition temperature of 150° C. or more.

The melting point of the polyimide resin is preferably 280° C. or more and more preferably 290° C. or more in consideration of heat resistance, and is more preferably 345° C. or less, further preferably 340° C. or less, and still further preferably 335° C. or less in consideration of exerting high molding processability.

In addition, the glass transition temperature of the polyimide resin is more preferably 160° C. or more and further preferably 170° C. or more in consideration of heat resistance, and is preferably 250° C. or less, more preferably 230° C. or less, and further preferably 200° C. or less in consideration of exerting high molding processability.

Both the melting point and the glass transition temperature of the polyimide resin can be measured by a differential scanning calorimeter.

In addition, in the polyimide resin, the exothermic amount (hereinafter, also simply referred to as "exothermic amount of crystallization") of the crystallization exothermic peak observed in melting and then cooling of the polyimide resin at a cooling rate of 20° C./min with differential scanning calorimetric measurement is preferably 5.0 mJ/mg or more, more preferably 10.0 mJ/mg or more, and further preferably 17.0 mJ/mg or more in consideration of enhancement of crystallinity, heat resistance, mechanical strength, and chemical resistance. The upper limit of the exothermic amount of crystallization is not particularly limited, and is usually 45.0 mJ/mg or less.

Specifically, the melting point, the glass transition temperature, and the exothermic amount of crystallization of the polyimide resin can be measured by the methods described in Examples.

The logarithmic viscosity of the polyimide resin at 30° C. in a 5 mass % concentrated sulfuric acid solution is preferably 0.2 to 2.0 dL/g and more preferably 0.3 to 1.8 dL/g. When the logarithmic viscosity is 0.2 dL/g or more, a molded article formed of the polyimide powder composition obtained has sufficient mechanical strength, and when the logarithmic viscosity is 2.0 dL/g or less, molding processability and handleability are good. The logarithmic viscosity p is obtained according to the following expression by measuring the elapsed times for flowing concentrated sulfuric acid and the polyimide resin solution at 30° C. with a Cannon-Fenske viscometer.

$$\mu = \ln(ts/t_0)/C$$

$t_0$: elapsed time for flowing concentrated sulfuric acid
ts: elapsed time for flowing polyimide resin solution
C: 0.5 (g/dL)

The weight average molecular weight Mw of the polyimide resin constituting the thermoplastic polyimide resin powder (A) is preferably in the range of 10,000 to 150,000, more preferably 15,000 to 100,000, further preferably 20,000 to 80,000, still further preferably 30,000 to 70,000, and still further preferably 35,000 to 65,000. When the weight average molecular weight Mw of the polyimide resin is 10,000 or more, the mechanical strength of a molded article obtained is good, when the Mw is 40,000 or more, the mechanical strength stability is good, and when the Mw is 150,000 or less, the molding processability is good.

The weight average molecular weight Mw of the polyimide resin can be measured by a gel permeation chromatography (GPC) method using polymethyl methacrylate (PMMA) as a standard sample.

(Volume Average Particle Size D50)

The thermoplastic polyimide resin powder (A) has a volume average particle size D50 of preferably 5 to 200 μm in consideration of handleability and in consideration of obtaining a polyimide powder composition having excellent flowability. The volume average particle size D50 of the thermoplastic polyimide resin powder (A) is more preferably 150 μm or less, further preferably 100 μm or less, and still further preferably 40 μm or less in consideration of obtaining a polyimide powder composition having excellent flowability.

The thermoplastic polyimide resin powder (A) having the above particle size is obtained by using, for example, a production method including a step of reacting a tetracarboxylic acid component with a diamine component in the presence of a solvent containing an alkylene glycol-based solvent represented by formula (I) mentioned later. The D50 of the thermoplastic polyimide resin powder (A) can be measured with a laser diffraction/light-scattering particle size distribution measuring instrument and can specifically be measured by the method described in Examples.

The shape and surface state of the thermoplastic polyimide resin powder (A) are not particularly limited, and the powder (A) may be in a porous form, for example. The fact that the thermoplastic polyimide resin powder (A) is in a porous form can be observed with a scanning electron microscope (SEM).

(True Density)

The true density of the thermoplastic polyimide resin powder (A) measured by a vapor phase method is preferably 1.0 to 1.8 g/cm$^3$, more preferably 1.1 to 1.6 g/cm$^3$, and further preferably 1.2 to 1.5 g/cm$^3$ in consideration of obtaining a polyimide powder composition having excellent flowability. Additionally, the true density of the thermoplastic polyimide resin powder (A) measured by a vapor phase method is preferably 0.8 to 1.7 g/cm$^3$, more preferably 0.9 to 1.5 g/cm$^3$, and further preferably 1.0 to 1.4 g/cm$^3$ in consideration of obtaining a polyimide powder composition having excellent flowability.

True density measurement by a vapor phase method can be performed according to "Method for measuring density and specific gravity by gas displacement method" specified in JIS Z8807:2012. True density measurement by a liquid phase method (pycnometer method) can be performed using n-butyl alcohol as a medium liquid by use of a wet true density measurement apparatus.

The above true density measurement can specifically be performed by the method described in Examples.

The difference ($D_1$-$D_2$) between the true density $D_1$ of the thermoplastic polyimide resin powder (A) measured by the vapor phase method and the true density $D_2$ measured by the liquid phase method is preferably 0.05 to 0.7 g/cm$^3$, more preferably 0.08 to 0.5 g/cm$^3$, and further preferably 0.18 to 0.4 g/cm$^3$. ($D_1$-$D_2$) is presumed to indicate the presence of fine pores into which the medium liquid used in the true density measurement by the liquid phase method cannot penetrate.

(Specific Surface Area)

The specific surface area of the thermoplastic polyimide resin powder (A) is preferably 1.0 to 50 m$^2$/g, more preferably 2.0 to 40 m$^2$/g, and further preferably 5.0 to 25 m$^2$/g in consideration of handleability and in consideration of obtaining a polyimide powder composition having excellent flowability. It is presumed that the above specific surface area is influenced by both the D50 and the pore volume of thermoplastic polyimide resin powder (A).

The specific surface area can be determined by a BET, and can specifically be measured by the method described in Examples.

(Total Pore Volume)

When the thermoplastic polyimide resin powder (A) is in a porous form, the total pore volume thereof is preferably 0.005 to 0.50 cc/g, more preferably 0.01 to 0.30 cc/g, and further preferably 0.015 to 0.20 cc/g in consideration of obtaining a polyimide powder composition having excellent flowability.

The above total pore volume can specifically be measured by the method described in Examples.

(Average Pore Diameter)

When the thermoplastic polyimide resin powder (A) is in a porous form, the average pore diameter is preferably 5 to 85 nm, more preferably 10 to 80 nm, and further preferably 20 to 70 nm in consideration of obtaining a polyimide powder composition having excellent flowability.

The above average pore diameter can specifically be measured by the method described in Examples.

(Method for Producing Thermoplastic Polyimide Resin Powder (A))

The thermoplastic polyimide resin powder (A) may be produced using a known method for producing a polyimide resin, and may be produced by reacting a tetracarboxylic acid component with a diamine component, for example.

Hereinafter, a case in which the polyimide resin constituting the thermoplastic polyimide resin powder (A) contains the repeating structural unit represented by the formula (1) and the repeating structural unit represented by the formula (2) is taken as an example, to describe a method for producing the thermoplastic polyimide resin powder (A).

When the polyimide resin contains the repeating structural unit represented by the formula (1) and the repeating structural unit represented by the formula (2), the tetracarboxylic acid component contains a tetracarboxylic acid containing at least one aromatic ring and/or a derivative thereof, and the diamine component contains a diamine containing at least one alicyclic hydrocarbon structure and a chain aliphatic diamine.

The tetracarboxylic acid containing at least one aromatic ring is preferably a compound having four carboxy groups that are bonded directly to the aromatic ring, and may contain an alkyl group in the structure thereof. The tetracarboxylic acid preferably has from 6 to 26 carbon atoms.

Preferred examples of the tetracarboxylic acid include pyromellitic acid, 2,3,5,6-toluenetetracarboxylic acid, 3,3',4,4'-benzophenonetetracarboxylic acid, 3,3',4,4'-biphenyltetracarboxylic acid and 1,4,5,8-naphthalenetetracarboxylic acid. Among these, pyromellitic acid is more preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate and dimethyl 1,4,5,8-naphthalenetetracarboxylate. The alkyl group in the alkyl ester compound of the tetracarboxylic acid preferably has from 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.0$^{2,6}$]decane, 3,3'-dimethyl-4,4'-diaminodicyclohexylmethane and 4,4'-diaminodicyclohexylpropane. These compounds may be used solely or may be used as a combination of two or more compounds selected therefrom. Among these, 1,3-bis(aminomethyl)cyclohexane is preferably used. A diamine containing an alicyclic hydrocarbon structure generally has conformational isomers, and the ratio of the cis isomer and the trans isomer is not particularly limited.

The chain aliphatic diamine may be in the form of either linear or branched chain, and has preferably from 5 to 16 carbon atoms, more preferably from 6 to 14 carbon atoms and further preferably from 7 to 12 carbon atoms. The linear moiety having from 5 to 16 carbon atoms may contain an ether bond in the course thereof. Preferred examples of the chain aliphatic diamine include 1,5-pentamethylenediamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof. Among these, a chain aliphatic diamine having from 8 to 10 carbon atoms can be preferably used, and at least one selected from the group consisting of 1,8-octamethylenediamine and 1,10-decamethylenediamine can be particularly preferably used.

In the production of the thermoplastic polyimide resin powder (A), the molar ratio of the charged amount of the diamine containing at least one alicyclic hydrocarbon structure with respect to the total amount of the diamine containing at least one alicyclic hydrocarbon structure and the chain aliphatic diamine is preferably 20 to 70 mol %. The molar ratio is more preferably 25 mol % or more, further preferably 30 mol % or more, still further preferably 32 mol % or more, and more preferably 60 mol % or less, further preferably 50 mol % or less, still further preferably less than 40 mol, and still further preferably 35 mol % or less in consideration of exerting high crystallinity.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the diamine containing at least one alicyclic hydrocarbon structure and the chain aliphatic diamine is preferably 25 mol % or less. The lower limit thereof is not particularly limited but needs to exceed 0 mol %.

The molar ratio is preferably 5 mol % or more, and more preferably 10 mol % or more, in consideration of enhancement of the heat resistance, and is preferably 20 mol % or less, and more preferably 15 mol % or less, in consideration of maintenance of the crystallinity.

In addition, the molar ratio is preferably 12 mol % or less, more preferably 10 mol % or less, further preferably 5 mol % or less, and still further preferably 0 mol % in consideration of a decrease in coloration of the thermoplastic polyimide resin powder (A).

In the production of the thermoplastic polyimide resin powder (A), the charged amount ratio of the tetracarboxylic acid component and the diamine component is preferably from 0.9 to 1.1 mol of the diamine component per 1 mol of the tetracarboxylic acid component.

In the production of the thermoplastic polyimide resin powder (A), an end capping agent may be mixed in addition to the tetracarboxylic acid component and the diamine component. The end capping agent is preferably at least one selected from the group consisting of a monoamine compound and a dicarboxylic acid compound. The amount of the end capping agent to be used may be any amount as long as a desired amount of an end group can be introduced into the polyimide resin constituting the thermoplastic polyimide resin powder (A), and the amount is preferably 0.0001 to 0.1 mol, more preferably 0.001 to 0.06 mol, and further preferably 0.002 to 0.035 mol, per 1 mol of the tetracarboxylic acid and/or the derivative thereof.

Examples of the monoamine end capping agent include methylamine, ethylamine, propylamine, butylamine, n-pentylamine, n-hexylamine, n-heptylamine, n-octylamine, n-nonylamine, n-decylamine, n-undecylamine, laurylamine, n-tridecylamine, n-tetradecylamine, isopentylamine, neopentylamine, 2-methylpentylamine, 2-methylhexylamine, 2-ethylpentylamine, 3-ethylpentylamine, isooctylamine, 2-ethylhexylamine, 3-ethylhexylamine, isononylamine, 2-ethyloctylamine, isodecylamine, isododecylamine, isotridecylamine, isotetradecylamine, benzylamine, 4-methylbenzylamine, 4-ethylbenzylamine, 4-dodecylbenzylamine, 3-methylbenzylamine, 3-ethylbenzylamine, aniline, 3-methylaniline and 4-methylaniline.

The dicarboxylic acid end capping agent is preferably a dicarboxylic acid compound, which may partially have a closed ring structure. Examples thereof include phthalic acid, phthalic anhydride, 4-chlorophthalic acid, tetrafluorophthalic acid, 2,3-benzophenonedicarboxylic acid, 3,4-benzophenonedicarboxylic acid, cyclohexane-1,2-dicarboxylic acid, cyclopentane-1,2-dicarboxylic acid and 4-cyclohexene-1,2-dicarboxylic acid. Among these, phthalic acid and phthalic anhydride are preferred.

Such an end capping agent may be used singly or in combinations of two or more.

Among these, the monoamine end capping agent is preferable, and a monoamine containing a chain aliphatic group having from 5 to 14 carbon atoms is more preferable and a monoamine containing a saturated linear aliphatic group having from 5 to 14 carbon atoms is further preferable in consideration of introduction of the chain aliphatic group having from 5 to 14 carbon atoms into the end of the polyimide resin constituting the thermoplastic polyimide resin powder (A) for enhancement of heat aging resistance. The chain aliphatic group preferably has 6 or more carbon atoms, more preferably has 7 or more carbon atoms and further preferably has 8 or more carbon atoms, and preferably has 12 or less carbon atoms, more preferably has 10 or less carbon atoms and further preferably has 9 or less carbon atoms. A monoamine containing a chain aliphatic group having 5 or more carbon atoms is preferable because of being hardly volatilized in production of the thermoplastic polyimide resin powder (A).

The end capping agent is particularly preferably at least one selected from the group consisting of n-octylamine, isooctylamine, 2-ethylhexylamine, n-nonylamine, isononylamine, n-decylamine, and isodecylamine, further preferably at least one selected from the group consisting of n-octylamine, isooctylamine, 2-ethylhexylamine, n-nonylamine, and isononylamine, and most preferably at least one selected from the group consisting of n-octylamine, isooctylamine, and 2-ethylhexylamine.

As a polymerization method for producing the thermoplastic polyimide resin powder (A), a known polymerization method may be applied, and examples thereof include, for example, solution polymerization, melt polymerization, solid phase polymerization, suspension polymerization and the like while not particularly limited. Among these, suspension polymerization under a high temperature condition using an organic solvent is preferred. On performing suspension polymerization under a high temperature condition, the polymerization is preferably performed at 150° C. or more, and more preferably at from 180 to 250° C. The polymerization time may vary depending on the monomers used, and is preferably approximately from 0.1 to 6 hours.

The method for producing the thermoplastic polyimide resin powder (A) preferably includes the step of reacting the tetracarboxylic acid component with the diamine component in the presence of a solvent containing an alkylene glycol-based solvent represented by the following formula (I). In this way, there may be obtained a polyimide resin powder excellent in handleability, and exerting good flowability when used in the polyimide powder composition of the present invention. The production method is preferable in that a polyimide resin powder can be easily obtained which has a D50 of 5 to 200 μm in particle size measurement with a laser diffraction/light-scattering particle size distribution measuring instrument.

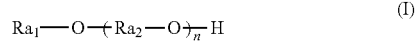

$$Ra_1\text{—}O\text{—}(Ra_2\text{—}O)_n\text{—}H \quad (I)$$

wherein $Ra_1$ represents a hydrogen atom or an alkyl group having from 1 to 4 carbon atoms; $Ra_2$ represents a linear alkylene group having from 2 to 6 carbon atoms; and n represents an integer of 1-3.

In order to obtain a homogeneous powder polyimide resin, it is considered to be desirable that the solvent in a one-pot reaction possess two properties of (1) homogeneously dissolving a polyamic acid or homogeneously dispersing a nylon salt, and (2) not dissolving and swelling the polyimide resin at all. A solvent comprising the alkylene glycol-based solvent represented by the formula (I) generally satisfies the two properties.

The alkylene glycol-based solvent has a boiling point of preferably 140° C. or more, more preferably 160° C. or more, and further preferably 180° C. or more, in consideration of feasible polymerization reaction under high temperature conditions at normal pressure.

In the formula (I), $Ra_1$ represents a hydrogen atom or an alkyl group having from 1 to 4 carbon atoms and is preferably an alkyl group having from 1 to 4 carbon atoms, and more preferably a methyl group or an ethyl group.

In the formula (I), $Ra_2$ represents a linear alkylene group having from 2 to 6 carbon atoms and is preferably a linear alkylene group having 2 or 3 carbon atoms, and more preferably an ethylene group.

In the formula (I), n represents an integer of 1-3 and is preferably 2 or 3.

Specific examples of the alkylene glycol-based solvent include ethylene glycol monomethyl ether, diethylene glycol monomethyl ether (also known as 2-(2-methoxyethoxy)ethanol), triethylene glycol monomethyl ether, ethylene glycol monoethyl ether, diethylene glycol monoethyl ether (also known as 2(2-ethoxyethoxy)ethanol), ethylene glycol monoisopropyl ether, diethylene glycol monoisopropyl ether, triethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, ethylene glycol monoisobutyl ether, ethylene glycol, and 1,3-propanediol. These solvents may each be used alone, or two or more solvents selected from them may be used in combination. Among these solvents, 2-(2-methoxyethoxy)ethanol, triethylene glycol monomethyl ether, 2-(2-ethoxyethoxy)ethanol, and 1,3-propanediol are preferred, and 2-(2-methoxyethoxy)ethanol and 2-(2-ethoxyethoxy)ethanol are more preferred.

The content of the alkylene glycol-based solvent in the solvent is preferably 30 mass % or more, more preferably 50 mass % or more, further preferably 75 mass % or more, and further preferably 90 mass % or more. The solvent may consist of the alkylene glycol-based solvent alone.

When the solvent contains the alkylene glycol-based solvent and an additional solvent, specific examples of the "additional solvent" include water, benzene, toluene, xylene, acetone, hexane, heptane, chlorobenzene, methanol, ethanol, n-propanol, isopropanol, butanol, pentanol, hexanol, heptanol, octanol, N-methyl-2-pyrrolidone, N,N-dimethylacetamide, N,N-diethylacetamide, N,N-dimethylformamide, N,N-diethylformamide, N-methylcaprolactam, hexamethylphosphoramide, tetramethylene sulfone, dimethylsulfoxide, o-cresol, m-cresol, p-cresol, phenol, p-chlorophenol, 2-chloro-4-hydroxytoluene, diglyme, triglyme, tetraglyme, dioxane, γ-butyrolactone, dioxolane, cyclohexanone, cyclopentanone, dichloromethane, chloroform, 1,2-dichloroethane, 1,1,2-trichloroethane, dibromomethane, tribromomethane, 1,2-dibromoethane, and 1,1,2-tribromoethane. These solvents may each be used alone, or two or more solvents selected from them may be used in combination.

Preferred examples of the method for producing the thermoplastic polyimide resin powder (A) include a method which involves separately preparing (a) a solution containing the tetracarboxylic acid component in a solvent containing the alkylene glycol-based solvent and (b) a solution containing the diamine component in a solvent containing the alkylene glycol-based solvent, then adding the solution (b) to the solution (a) or adding the solution (a) to the solution (b), thereby preparing (c) a solution containing a polyamic acid, and subsequently imidizing the polyamic acid as well as depositing a polyimide resin powder in the solution (c) by the heating of the solution (c), thereby synthesizing a polyimide resin powder.

While the reaction of the tetracarboxylic acid component with the diamine component can be performed either under normal pressure or under pressure, the reaction is preferably performed under normal pressure because no pressure resistant container is required under normal pressure.

When the end capping agent is used, it is preferable to mix the solution (a) and the solution (b), mix the end capping agent with the mixed solution to prepare the solution (c) containing a polyamic acid, and subsequently heat the solution (c), and it is more preferable to add the end capping agent after completion of addition of the solution (b) to the solution (a), to prepare the solution (c) containing a polyamic acid, and subsequently heat the solution (c).

In the method for producing the thermoplastic polyimide resin powder (A), preferably, the tetracarboxylic acid component contains a tetracarboxylic dianhydride; the step of reacting the tetracarboxylic acid component with the diamine component includes: step (i) of adding (b) a solution containing the diamine component and the alkylene glycol-based solvent to (a) a solution containing the tetracarboxylic acid component and the alkylene glycol-based solvent, thereby preparing (c) a solution containing a polyamic acid; and step (ii) of imidizing the polyamic acid as well as depositing a polyimide resin powder in the solution (c) by the heating of the solution (c), thereby providing a polyimide resin powder; and in the step (i), the solution (b) is added to the solution (a) such that the amount of the diamine component added per unit time with respect to 1 mol of the tetracarboxylic acid component is 0.1 mol/min or less, in consideration of reduction in the amount of by-products in the thermoplastic polyimide resin powder (A).

<Silica Particles (B)>

The polyimide powder composition of the present invention contains the thermoplastic polyimide resin powder (A) and silica particles (B) having a volume average particle size D50 of 90 nm or less (hereinafter, also simply referred to as "silica particles (B)").

Combining the thermoplastic polyimide resin powder (A) and silica particles (B) having a volume average particle size D50 equal to or less than a predetermined value makes the flowability and molding processability good, and enables a polyimide powder composition to be obtained which is suitable for materials for three-dimensional shaping and matrix resin materials for a fiber-reinforced composite. When the D50 of the silica particles to be used exceeds 90 nm, the flowability of the polyimide powder composition obtained is lowered.

The volume average particle size D50 of the silica particles (B) is preferably 80 nm or less, more preferably 60 nm or less, further preferably 50 nm or less, and still further preferably 30 nm or less in consideration of obtaining a polyimide powder composition having excellent flowability. The volume average particle size D50 of the silica particles (B) is preferably 5 nm or more.

The D50 of the silica particles can be measured with a laser diffraction/light-scattering particle size distribution measuring instrument and can specifically be measured by the method described in Examples.

The silica particles (B) may be silica particles subjected to no surface treatment (hydrophilic silica particles) or may be silica particles (hydrophobic silica particles) in which hydrophilic groups such as hydroxy groups on the surface of the silica particles are surface-treated with a surface treatment agent. The silica particles (B) are preferably silica particles surface-treated with a surface treatment agent in consideration of suppressing aggregation among silica particles and in consideration of affinity for the thermoplastic polyimide resin powder (A).

The surface treatment agent may be any treatment agent that may react with hydroxy groups and the like present on the surface of silica particles subjected to no surface treatment, and is preferably a silane compound in consideration of reactivity as the surface treatment agent.

The silane compound is preferably a silane coupling agent. Examples thereof include a silane coupling agent having a phenyl group such as phenyltrimethoxysilane and phenyltriethoxysilane; a silane coupling agent having a (meth)acryl group such as 3-acryloxypropyltrimethoxysilane, 3-acryloxypropyltriethoxysilane, 3-methacryloxypropyltrimethoxysilane, 3-methacryloxypropyltriethoxysilane, 3-methacryloxypropylmethyldimethoxysilane, and 3-methacryloxypropylmethyldiethoxysilane; a silane coupling agent having a vinyl group such as vinyltrimethoxysilane, vinyltriethoxysilane, p-styryltrimethoxysilane, and p-styryltriethoxysilane; a silane coupling agent having an epoxy group such as 3-glycidyloxypropyltrimethoxysilane, 3-glycidyloxypropyltriethoxysilane, 3-glycidyloxypropylmethyldimethoxysilane, 3-glycidyloxypropylmethyldiethoxysilane, and 2-(3,4-epoxycyclohexyl)ethyltrimethoxysilane; and a silane coupling agent having an amino group such as 3-aminopropyltrimethoxysilane, 3-aminopropyltriethoxysilane, and N-phenyl-3-aminopropyltrimethoxysilane. One or two or more of these can each be used. As the surface treatment agent, the above silane coupling agent and an organosilazane may be used in combination.

The above surface treatment agent is preferably one or more selected from the group consisting of a silane coupling agent having a phenyl group, a silane coupling agent having a (meth)acryl group, and a silane coupling agent having a vinyl group, more preferably one or more selected from the group consisting of a silane coupling agent having a phenyl group and a silane coupling agent having a (meth)acryl group, and further preferably a silane coupling agent having a phenyl group in consideration of obtaining a polyimide powder composition having excellent flowability. That is, the silica particles (B) are preferably one or more selected from the group consisting of phenylsilane-treated silica particles, (meth)acrylsilane-treated silica particles, and vinylsilane-treated silica particles, more preferably one or more selected from the group consisting of phenylsilane-treated silica particles and (meth)acrylsilane-treated silica particles, and further preferably phenylsilane-treated silica particles in consideration of obtaining a polyimide powder composition having excellent flowability.

The amount of the surface treatment agent to be used in the surface treatment of the silica particles (B) is not particularly limited, and is usually in the range of 0.01 to 20 mass % and preferably in the range of 0.1 to 15 mass % with respect to the silica particles (B).

The content of the silica particles (B) in the polyimide powder composition is preferably 0.05 to 10 parts by mass, more preferably 0.1 to 5.0 parts by mass, further preferably 0.2 to 3.0 parts by mass, and still further preferably 0.2 to 1.5 parts by mass, as the content of the silica particles (B) with respect to 100 parts by mass of the thermoplastic polyimide resin powder (A). When the content of the silica particles (B) in the polyimide powder composition falls within the above range, the polyimide powder composition has good flowability. It is preferable that a content of the silica particles (B) is 10 parts by mass or less with respect to 100 parts by mass of the thermoplastic polyimide resin powder (A) in respect of the economy.

The total content of the thermoplastic polyimide resin powder (A) and the silica particles (B) in the polyimide powder composition is preferably 70 mass % or more, more preferably 80 mass % or more, and further preferably 90 mass % or more in consideration of maintaining good flowability and molding processability. The upper limit thereof is 100 mass %.

<Additive>

In the polyimide powder composition of the present invention, additives may be mixed, if necessary, such as a filler, a delusterant, a nucleating agent, a plasticizer, an antistatic agent, an anti-coloring agent, an anti-gelling agent, a flame retardant, a colorant, a slidability-improving agent, an antioxidant, a conducting agent, and a resin-modifying agent.

The amount of the above additive mixed is not particularly limited, and usually 50 mass % or less, preferably 0.0001 to 30 mass %, more preferably 0.001 to 20 mass %, and further preferably 0.01 to 10 mass % in the polyimide powder composition in consideration of maintaining the flowability of the polyimide powder composition as well as exerting the effect of the additive.

The polyimide powder composition of the present invention can be produced by, for example, mixing and blending the thermoplastic polyimide resin powder (A), the silica particles (B), and additives to be used, if necessary. Examples of the blending method that can be employed include a blending method by shaking, a blending method with a stirring blade such as a Nauta mixer and a Henschel mixer, a method of liquid-phase blending in a solvent followed by drying, and a blending method of stirring with an air flow using a flash blender.

The flowability of the polyimide powder composition can be evaluated by measuring an angle of repose, for example. That the polyimide powder composition having a smaller angle of repose means that the flowability is good, and the angle of repose is preferably 30° or less, more preferably 25° or less, and further preferably 20° or less.

The angle of repose of the polyimide powder composition can be measured with a multi-functional apparatus for measuring powder physical properties and can specifically be measured by the method described in Examples.

The polyimide powder composition of the present invention, which has excellent flowability and good molding processability, is thus suitably used as a material for three-dimensional shaping, for example, a molding material for a 3D printer and also suitably used as a matrix resin material for a fiber-reinforced composite such as a carbon fiber-reinforced thermoplastic resin (CFRTP).

When the polyimide powder composition of the present invention is used as a material for three-dimensional shaping, a molded article that accurately reproduces a three-dimensional shape can be produced with good productivity. When the polyimide powder composition of the present invention is used as a matrix resin material for a fiber-reinforced composite, the composition is excellent in impregnating properties for a continuous fiber material because of having high flowability. The continuous fiber material refers to a fiber material longer than 50 mm.

[Molded Article]

The present invention also provides a molded article obtained by molding the polyimide powder composition. The method for producing a molded article using the polyimide powder composition of the present invention can be appropriately selected depending on the shape and application of the molded article.

When the polyimide powder composition is used as a molding material for a 3D printer, for example, a molded article can be produced by a powder sintering method.

When the polyimide powder composition is used as a matrix resin material for a fiber-reinforced composite, the polyimide powder composition is attached to a continuous fiber material by means of vibration, electric charge, or the like. Thereafter, the polyimide powder composition is melted under application of heat and pressure by means of a double belt press, a vacuum pressing apparatus, a calender roll, an IR heater, ultrasonic vibration, laser irradiation, or the like so as to impregnate the continuous fiber material with the polyimide powder composition to thereby form prepreg. Then, a molding article can be produced by molding the prepreg by a known method such as a compression molding method or a vacuum molding method.

Since the polyimide powder composition of the present invention has thermoplasticity, the molded article can be easily produced also by heat-molding the polyimide powder composition. Examples of the heat molding method include injection molding, extrusion molding, blow molding, heat press molding, vacuum molding, pneumatic molding, laser molding, welding, and heat adhesion, and the polyimide powder composition of the present invention may be molded by any molding method that includes a heat melting step. Heat molding is preferable because molding is enable without setting the molding temperature to an elevated temperature more than 400° C., for example. Among these, injection molding is preferably performed because such molding can be performed without the molding temperature and the mold temperature in molding being set at high temperatures. For example, injection molding can be performed at a molding temperature of preferably 400° C. or less and more preferably 360° C. or less and a mold temperature of preferably 260° C. or less, more preferably 260° C. or less, and more preferably 200° C. or less.

EXAMPLES

The present invention will be described in more detail with reference to examples below, but the present invention is not limited thereto. Various measurements and evaluations in each Production Example, and Example were carried out in the following manners.

<Infrared Spectroscopy (IR Measurement)>

The IR measurement of the polyimide resin powder was performed with "JIR-WINSPEC 50", produced by JEOL, Ltd.

<Logarithmic Viscosity μ>

After the polyimide resin powder was dried at from 190 to 200° C. for 2 hours, a polyimide resin solution prepared by dissolving 0.100 g of the polyimide resin particles in 20 mL of concentrated sulfuric acid (96%, produced by Kanto Chemical Co., Inc.) as the measurement sample was subjected to measurement at 30° C. with a Cannon-Fenske viscometer. The logarithmic viscosity p was obtained according to the following expression.

$$\mu = \ln(t_s/t_0)/C$$

$t_0$: elapsed time for flowing concentrated sulfuric acid
$t_s$: elapsed time for flowing polyimide resin solution
C: 0.5 g/dL <Melting Point, Glass Transition Temperature, Crystallization Temperature, and Exothermic Amount of Crystallization>

The melting point Tm, the glass transition temperature Tg, the crystallization temperature Tc, and the exothermic amount of crystallization ΔHm of the polyimide resin powder were measured with a differential scanning calorimeter ("DSC-6220", produced by SII Nanotechnology, Inc.).

The polyimide resin powder was subjected to the following thermal history in a nitrogen atmosphere. The condition of the thermal history included the first heating (heating rate: 10° C./min), then cooling (cooling rate: 20° C./min), and then second heating (heating rate: 10° C./min).

The melting point (Tm) was determined by reading the peak top value of the endothermic peak observed in the second heating. The glass transition temperature (Tg) was determined by reading the value observed in the second heating. The crystallization temperature (Tc) was determined by reading the peak top value of the exothermic peak observed in cooling.

The exothermic amount of crystallization ΔHm (mJ/mg) was calculated from the area of the exothermic peak observed in cooling.

<Crystallization Half-Time>

The crystallization half-time of the polyimide resin powder was measured with a differential scanning calorimeter ("DSC-6220", produced by SII Nanotechnology, Inc.).

A polyimide resin powder having a crystallization half-time of 20 seconds or less was measured under such conditions that in a nitrogen atmosphere, the polyimide resin powder was held at 420° C. for 10 minutes for melting the polyimide resin powder completely, and then quenched at a cooling rate of 70° C./min, during which the time required from the appearance of the crystallization peak observed to the peak top thereof was calculated for determining the crystallization half-time.

<Weight Average Molecular Weight>

The weight average molecular weight (Mw) of the polyimide resin powder was measured with a gel permeation chromatography (GPC) measurement apparatus "Shodex GPC-101" produced by Showa Denko K.K. under the following conditions.

Column: Shodex HFIP-806M
Mobile phase solvent: HFIP containing 2 mM sodium trifluoroacetate
Column temperature: 40° C.
Flow rate of mobile phase: 1.0 mL/min
Specimen concentration: about 0.1 mass %
Detector: IR detector
Amount of injection: 100 μm
Calibration curve: standard PMMA <Volume Average Particle Size (D50)>

The D50 of the polyimide resin powder and the silica particles was determined with laser diffraction/light-scattering particle size distribution measurement.

As the measurement instrument, a laser diffraction/light-scattering particle size distribution measuring instrument "LMS-2000e" produced by Malvern Panalytical Ltd. was used. The measurement of the D50 of the polyimide resin powder was performed with water as a dispersion medium in a condition where the polyimide resin powder was sufficiently dispersed under an ultrasonic condition. The measurement range was from 0.02 to 2000 μm.

<True Density (Vapor Phase Method)>

The true density measurement of the polyimide resin powder by a vapor phase method was performed using "VM-100" produced by Seishin Enterprise Co., Ltd. as the measurement instrument and helium gas as the gas according to "Method for measuring density and specific gravity by gas displacement method" specified in JIS Z8807:2012.

<True Density (Liquid Phase Method)>

The true density measurement of the polyimide resin powder by a liquid phase method (pycnometer method) was performed using an automatic wet true density measurement instrument "AUTO TRUE DENSER MAT-7000" produced by Seishin Enterprise Co., Ltd. as the measurement instrument and n-butyl alcohol as the medium liquid, and the true density was determined by the following expression.

$$Pd = \frac{Wb - Wa}{(Wb - Wa) + (Wd - Wc)} \times Ld \quad \text{[Expression 1]}$$

Pd: true density of the sample
Wa: mass of measurement cell
Wb: mass of (measurement cell+sample)
Wc: mass of (measurement cell+sample+medium liquid)
Wd: mass of (measurement cell+medium liquid) mass
Ld: density of the medium liquid <Specific Surface Area>

The specific surface area of the polyimide resin powder was determined by a BET method from an adsorption isotherm (vertical axis: amount of nitrogen adsorbed, horizontal axis: relative pressure $P/P_0$) obtained by measurement of the amount of nitrogen adsorbed under the following conditions. As the measurement sample, one pretreated by vacuum degassing under heating at 180° C. for six hours was used.

Measurement instrument: quadruple-type specific surface area/pore distribution measurement instrument NOVA-TOUCH type produced by Quantachrome Instruments
Gas used: nitrogen gas
Refrigerant: liquid nitrogen (temperature: 77.35 K)
Measurement relative pressure: $5 \times 10^{-3} < P/P_0 < 0.99$
Isotherm date used for calculation of specific surface area: $0.05 < P/P_0 < 0.3$ <Total Pore Volume>

The total pore volume of the polyimide resin powder was determined from the amount of nitrogen adsorbed at $P/P_{0,\,max}$ on the adsorption isotherm, on the assumption that the pores were filled with liquid nitrogen.

<Average Pore Diameter>

The average pore diameter of the polyimide resin powder was determined by the following expression.

Average pore diameter $D_{ave}=(4V_{total}/S)$ $V_{total}$: total pore volume
S: specific surface area (BET method)

<Angle of Repose>

The angle of repose of the polyimide powder composition was measured using a multi-functional apparatus for measuring powder physical properties "Multi Tester MT-02" produced by Seishin Enterprise Co., Ltd. A repose angle unit was used, and the polyimide powder composition was poured through a funnel onto a round table having a diameter of 80 mm. The sample was imaged with a CCD camera in two directions, and the angle of repose was determined from the average value (measurement range of the angle of repose: 0 to 90°).

The digits after the decimal point of the angle of repose were rounded off, and evaluation was performed according to the following criteria. A smaller angle of repose indicates that the powder is more excellent in flowability.

AAA: angle of repose of 190 or less
AA: angle of repose of 200 to 250
A: angle of repose of 260 to 300
B: angle of repose of 310 to 350
C: angle of repose of 360 to 400
D: angle of repose of 410 or more

[Production Example 1] Production of Polyimide Resin Powder 1

600 g of 2-(2-methoxyethoxy)ethanol (produced by Nippon Nyukazai Co., Ltd.) and 218.58 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. Meanwhile, 49.42 g (0.347 mol) of 1,3-bis(aminomethyl)cyclohexane (produced by Mitsubishi Gas Chemical Company, Inc., cis/trans ratio=7/3) and 93.16 g (0.645 mol) of 1,8-octamethylenediamine (produced by Kanto Chemical Co., Inc.) were dissolved in 250 g of 2-(2-methoxyethoxy)ethanol with a 500 mL beaker, thereby preparing a mixed diamine solution. This mixed diamine solution was gradually added thereto with a plunger pump. Heat was generated due to the drop addition, but the internal temperature was adjusted to be within the range of from 40 to 80° C. This dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy)ethanol and 1.934 g (0.0149 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 180° C. for 10 hours with a drier, thereby providing 316 g of a polyimide resin powder 1.

The measurement of the IR spectrum of the polyimide resin powder 1 showed the characteristic absorption of an imide ring $v(C=O)$ observed at 1768 and 1697 (cm$^{-1}$). The logarithmic viscosity was 0.96 dL/g, Tm was 320° C., Tg was 184° C., Tc was 266° C., the exothermic amount of crystallization ΔHm was 20.1 mJ/mg, the crystallization half-time was 20 seconds or less, Mw was 34,000, and D50 was 17 μm.

[Production Example 2] Production of Polyimide Resin Powder 2

500 g of 2-(2-methoxyethoxy)ethanol (produced by Nippon Nyukazai Co., Ltd.) and 218.12 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 49.79 g (0.35 mol) of 1,3-bis(aminomethyl) cyclohexane (produced by Mitsubishi Gas Chemical Company, Inc., cis/trans ratio=7/3) and 93.77 g (0.65 mol) of 1,8-octamethylenediamine (produced by Kanto Chemical Co., Inc.) were dissolved in 250 g of 2-(2-methoxyethoxy)ethanol with a 500 mL beaker, thereby preparing a mixed diamine solution. This mixed diamine solution was added gradually with a plunger pump. Heat was generated due to the drop addition, but the internal temperature was adjusted to be within the range of 40 to 80° C. The dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy)ethanol and 1.284 g (0.0100 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 180° C. for 10 hours with a drier, thereby providing 317 g of a polyimide resin powder 2.

The measurement of the IR spectrum of the polyimide resin powder 2 showed the characteristic absorption of an imide ring $v(C=O)$ observed at 1768 and 1697 (cm$^{-1}$). The logarithmic viscosity was 1.30 dL/g, Tm was 323° C., Tg was 184° C., Tc was 266° C., the exothermic amount of crystallization ΔHm was 21.0 mJ/mg, the crystallization half-time was 20 seconds or less, Mw was 55,000, and D50 was 17 μm.

[Production Example 3] Production of Polyimide Resin Powder 3

650 g of 2-(2-methoxyethoxy)ethanol (produced by Nippon Nyukazai Co., Ltd.) and 257.75 g (1.180 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. Meanwhile, 83.96 g (0.5902 mol) of 1,3-bis(aminomethyl)cyclohexane (produced by Mitsubishi Gas Chemical Company, Inc., cis/trans ratio=7/3), 54.86 g (0.4722 mol) of 1,6-hexamethylenediamine (produced by Wako Pure Chemical Industries, Ltd.), and 23.64 g (0.1180 mol) of 4,4'-diaminodiphenyl ether (produced by Wakayama Seika Kogyo Co., Ltd.) were dissolved in 250 g of 2-(2-methoxyethoxy)ethanol with a 500 mL beaker, thereby preparing a mixed diamine solution. This mixed diamine solution was gradually added thereto with a plunger pump. Heat was generated due to the drop addition, but the internal temperature was adjusted to be within the range of from 40 to 80° C. This dropwise addition of the mixed diamine solution was carried out in a nitrogen flow state over the whole period. The number of rotations of the agitation blade was set to 250 rpm. After the completion of the dropwise addition, 100 g of 2-(2-methoxyethoxy)ethanol and 2.270 g (0.0176 mol) of n-octylamine (produced by Kanto Chemical Co., Inc.) as an end capping agent were added thereto, and the mixture was further agitated. At this stage, a yellow clear homogeneous polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 130 to 150° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 190° C. for 10 hours with a drier, thereby providing 360 g of a polyimide resin powder 3.

The measurement of the IR spectrum of the polyimide resin powder 3 showed the characteristic absorption of an imide ring ν(C=O) observed at 1771 and 1699 (cm$^{-1}$). The logarithmic viscosity was 0.63 dL/g, Tm was 335° C., Tg was 229° C., Tc was 308° C., the exothermic amount of crystallization ΔHm was 12.0 mJ/mg, the crystallization half-time was 20 seconds or less, Mw was 30,000, and D50 was 33 μm.

[Production Example 4] Production of Polyimide Resin Powder 4

12.50 kg of 2-(2-methoxyethoxy)ethanol (produced by Nippon Nyukazai Co., Ltd.) and 5.453 kg (25.00 mol) of pyromellitic dianhydride (produced by Mitsubishi Gas Chemical Company, Inc.) precisely weighed were introduced in a reaction vessel equipped with an agitator, a thermometer, a dropping funnel, and nitrogen introducing tube. The vessel was sufficiently purged with nitrogen and then filled with nitrogen to an internal pressure of 0.4 MPa. While agitation was further made inside the system under a small amount of nitrogen flow, the mixture was agitated so as to become a homogeneous suspended solution. Meanwhile, 1.244 kg (8.75 mol) of 1,3-bis(aminomethyl)cyclohexane (produced by Mitsubishi Gas Chemical Company, Inc., cis/trans ratio=7/3) and 2.344 kg (16.25 mol) of 1,8-octamethylenediamine (produced by Kanto Chemical Co., Inc.) were dissolved in 6.25 kg of 2-(2-methoxyethoxy)ethanol, thereby preparing a mixed diamine solution. This mixed diamine solution was gradually added thereto under agitation. Heat was generated due to the drop addition, but the internal temperature was adjusted to be within the range of from 40 to 80° C. This dropwise addition of the mixed diamine solution was carried out in a nitrogen flow state over the whole period. The number of rotations of the agitation blade was set to 40 rpm. After the completion of the dropwise addition, 3.25 kg of 2-(2-methoxyethoxy)ethanol and 32.10 g (0.2500 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 50 rpm, and the polyamic acid solution in the reaction vessel was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and filtered. The obtained polyimide resin powder was washed with 7.5 kg of 2-(2-methoxyethoxy)ethanol and 7.5 kg of methanol, filtered, and then dried at 180° C. for 10 hours with a drier, thereby providing 7.92 kg of a polyimide resin powder 4.

The measurement of the IR spectrum of the polyimide resin powder 4 showed the characteristic absorption of an imide ring ν(C=O) observed at 1768 and 1697 (cm$^{-1}$). The logarithmic viscosity was 1.30 dL/g, Tm was 323° C., Tg was 184° C., Tc was 266° C., the exothermic amount of crystallization ΔHm was 21.0 mJ/mg, the crystallization half-time was 20 seconds or less, Mw was 55,000, and D50 was 11 μm.

The composition and evaluation results of the polyimide resin powder in each Production Example are shown in Table 1. The values expressed in mol % of the tetracarboxylic acid component and the diamine component in Table 1 are values calculated from the charged amount of each component in production of the polyimide resin powder.

TABLE 1

| | | Tetracarboxylic acid component (mol % in the total tetracarboxylic acid component) | Diamine component (mol % in the total diamine component) | | | | (1)/{(1) + (2)} | Tm | Tg | Tc |
|---|---|---|---|---|---|---|---|---|---|---|
| | | PMDA | 1,3-BAC | HMDA | OMDA | ODA | (mol %) | ° C. | ° C. | ° C. |
| Production Example 1 | Polyimide resin powder 1 | 100 | 35 | — | 65 | — | 35 | 320 | 184 | 266 |
| Production Example 2 | Polyimide resin powder 2 | 100 | 35 | — | 65 | — | 35 | 323 | 184 | 266 |

TABLE 1-continued

| | | | | | | | | | |
|---|---|---|---|---|---|---|---|---|---|
| Production Example 3 | Polyimide resin powder 3 | 100 | 50 | 40 | — | 10 | 56 | 335 | 229 | 308 |
| Production Example 4 | Polyimide resin powder 4 | 100 | 35 | — | 65 | — | 35 | 323 | 184 | 266 |

| | | Exothermic amount of crystallization ΔHm mJ/mg | Crystallization half-time Second | Mw — | D50 mm | True density (vapor phase method) g/cm³ | True density (liquid phase method) g/cm³ | Specific surface area m²/g | Total pore volume cc/g | Average pore diameter nm |
|---|---|---|---|---|---|---|---|---|---|---|
| Production Example 1 | Polyimide resin powder 1 | 20.1 | <20 | 34,000 | 17 | 1.38 | 1.12 | 10.6 | 0.135 | 51.2 |
| Production Example 2 | Polyimide resin powder 2 | 21.0 | <20 | 55,000 | 17 | 1.31 | 1.19 | 9.6 | 0.056 | 23.6 |
| Production Example 3 | Polyimide resin powder 3 | 12.0 | <20 | 30,000 | 33 | 1.36 | 1.19 | 2.5 | 0.018 | 28.9 |
| Production Example 4 | Polyimide resin powder 4 | 21.0 | <20 | 55,000 | 11 | 1.32 | 1.24 | 16.6 | 0.087 | 21.2 |

Abbreviations in the Table 1 are as follows.

PMDA; pyromellitic dianhydride 1,3-BAC; 1,3-bis(aminomethyl)cyclohexane

HMDA; 1,6-hexamethylenediamine

OMDA; 1,8-octamethylenediamine

ODA; 4,4'-diaminodiphenyl ether

Figure 2:
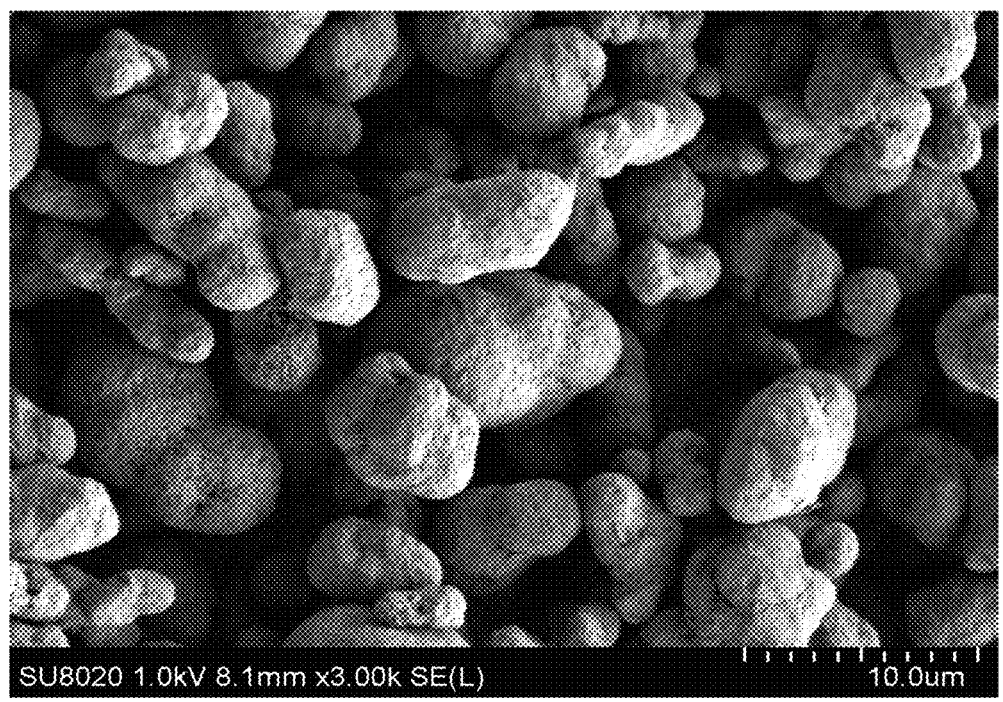
FIG. 2 is an image of a polyimide resin powder 4 obtained in Production Example 4, which image is obtained under observation with a scanning electron microscope.

FIG. 1 is an image of the polyimide resin powder 1 obtained in Production Example 1 and FIG. 2 is an image of the polyimide resin powder 4 obtained in Production Example 4, both of which were obtained under observation with a scanning electron microscope (SEM). The observation conditions are as follows. Any of the polyimide resin powders were confirmed to be in a porous form.

<SEM Observation Conditions>

Scanning electron microscope: "SU8020" produced by Hitachi High-Technologies Corporation Acceleration voltage: 1.0 kV Observation magnification: 3000 times

[Preparation and Evaluation of Polyimide Powder Composition 1: Flowability]

Example 1

To a capped wide-mouth bottle made of polypropylene having a capacity of 250 cc (I-Boy), added were 50 g of the polyimide resin powder 1 obtained in Production Example 1 and 0.05 g of silica particles "YA010C-SP3" (volume average particle size D50=10 nm, phenylsilane-treated) produced by Admatechs Company Limited. The cap was closed, and the bottle was shaken vertically 50 times for dry-blending to thereby prepare a polyimide powder composition. The obtained polyimide powder composition was used to measure the angle of repose according to the method mentioned above. The evaluation results are shown in Table 2.

Examples 2 to 9 and Comparative Examples 1 to 5

A polyimide powder composition was prepared and the angle of repose was measured according to the same method as in Example 1 except that the type and amount mixed of the polyimide resin powder and silica particles were changed as shown in Table 2. The evaluation results are shown in Table 2.

TABLE 2

| | | Example | | | | | | | | | Comparative Example | | | | |
|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 |
| Thermoplastic polyimide resin powder (parts by mass) | (A1) Polyimide resin powder 1 (D50 = 17 mm) | 100 | 100 | 100 | 100 | 100 | 100 | | | | 100 | 100 | | | |
| | (A2) Polyimide resin powder 2 (D50 = 17 mm) | | | | | | | 100 | | | | | 100 | | |
| | (A3) Polyimide resin powder 3 (D50 = 33 mm) | | | | | | | | 100 | | | | | 100 | |
| | (A4) Polyimide resin powder 4 (D50 = 11 mm) | | | | | | | | | 100 | | | | | 100 |
| Silica particles (parts by mass) | (B1) YA010C-SP3 (D50 = 10 nm/phenylsilane-treated) | 0.1 | 0.5 | 2.0 | | | | 0.5 | 0.5 | 0.5 | | | | | |
| | (B2) YA050C-SP3 (D50 = 50 nm/phenylsilane-treated) | | | | | 0.5 | | | | | | | | | |

TABLE 2-continued

|  |  | Example |  |  |  |  |  |  |  |  | Comparative Example |  |  |  |  |
|---|---|---|---|---|---|---|---|---|---|---|---|---|---|---|---|
|  |  | 1 | 2 | 3 | 4 | 5 | 6 | 7 | 8 | 9 | 1 | 2 | 3 | 4 | 5 |
|  | (B3) YA010C-SM1 (D50 = 10 nm/methacrylsilane-treated) |  |  |  |  | 0.5 |  |  |  |  |  |  |  |  |  |
|  | (B4) YA010C-SV1 (D50 = 10 nm/vinylsilane-treated) |  |  |  |  |  | 0.5 |  |  |  |  |  |  |  |  |
|  | (b1) YA100C-SP3 (D50 = 100 nm/phenylsilane-treated) |  |  |  |  |  |  |  |  |  |  | 0.5 |  |  |  |
| Flowability evaluation results | Angle of repose (°) | 30 | 17 | 22 | 26 | 28 | 35 | 27 | 26 | 23 | 41 | 40 | 41 | 40 | 49 |
|  | Evaluation | A | AAA | AA | A | A | B | A | A | AA | D | C | D | C | D |

The detail of each components shown in Table 2 are as follows.

<Thermoplastic Polyimide Resin Powder (A)>
(A1) Polyimide resin powder 1 obtained in Production Example 1, Mw: 34,000, D50=17 μm
(A2) Polyimide resin powder 2 obtained in Production Example 2, Mw: 55,000, D50=17 μm
(A3) Polyimide resin powder 3 obtained in Production Example 3, Mw: 30,000, D50=33 μm
(A4) Polyimide resin powder 4 obtained in Production Example 4, Mw: 55,000, D50=11 μm <Silica Particles (B)>
(B1) "YA010C-SP3": produced by Admatechs Company Limited, volume average particle size D50=10 nm, phenylsilane-treated
(B2) "YA050C-SP3": produced by Admatechs Company Limited, volume average particle size D50=50 nm, phenylsilane-treated
(B3) "YA010C-SM1": produced by Admatechs Company Limited, volume average particle size D50=10 nm, methacrylsilane-treated
(B4) "YA010C-SV1": produced by Admatechs Company Limited, volume average particle size D50=10 nm, vinylsilane-treated <Silica Particles Other than (B)>
(b1) "YA100C-SP3": produced by Admatechs Company Limited, volume average particle size D50=100 nm, phenylsilane-treated It can be seen from the results of Table 2 that all the polyimide powder compositions of the present invention containing the thermoplastic polyimide resin powder (A) and the silica particles (B) having a volume average particle size D50 of 90 nm or less have a small angle of repose and are excellent in flowability.

In contrast, the polyimide powder compositions of Comparative Example 1, 3, 4, and 5, which contain no silica particles, and the polyimide powder composition of Comparative Example 2, which contains silica particles having a volume average particle size D50 more than 90 nm, were inferior in flowability to the polyimide powder compositions of Examples.

[Evaluation of Polyimide Powder Composition 2: Impregnating Properties for Continuous Fiber Material]

Carbon fiber, which is a continuous fiber having a width of 10 mm ("Tenax filament HTS40/24K" produced by TEIJIN LIMITED, average fiber diameter: 7 μm, fineness: 1,600 tex, number of filaments: 24,000) was homogeneously dusted with the polyimide powder composition obtained in Example 7 such that the carbon fiber content reached 70 mass %. The same operation was repeated to laminate six layers in total. This was subjected to heat press molding with a vacuum pressing apparatus (produced by Kodaira Seisakusho Co., Ltd.) at a pressing machine temperature of 370° C. and a press pressure of 10 kN for a press time of 600 seconds. For this press, aluminum plates of 25 cm×25 cm×0.5 mm thick were placed above and below the pressing machine in order to facilitate delivery after the molding. After cooling, the aluminum plates were removed to obtain a plate 1 having a thickness of 1.2 mm.

Meanwhile, for comparison, the polyimide powder composition obtained in Comparative Example 3, which contains the polyimide resin powder 2 as in Example 7 but no silica particles, was used to obtain a plate 2 according to the same method described above.

When the plate 1 and plate 2 were compared and visually observed, the plate 1 had better glossiness and a better appearance than those of the plate 2. It is considered that this is because the carbon fiber as a continuous fiber was well impregnated with the polyimide powder composition of Example 7 in the plate 1.

INDUSTRIAL APPLICABILITY

The polyimide powder composition of the present invention has high flowability. Thus, even when used for powder sintering-type three-dimensional shaping, the polyimide powder composition has good shape reproducibility and is also excellent in productivity because of having good molding processability. The polyimide powder composition is suitable as, for example, a material for three-dimensional shaping such as a molding material for powder sintering-type 3D printers, and additionally, a matrix resin material for a fiber-reinforced composite such as a carbon fiber-reinforced thermoplastic resin (CFRTP).

The invention claimed is:

1. A polyimide powder composition comprising a thermoplastic polyimide resin powder (A) and silica, particles (B), wherein the silica particles have a volume average particle size D50 of 90 nm or less,
   wherein a polyimide resin constituting the thermoplastic polyimide resin powder (A) comprises a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) is from 20 mol % to less than 40 mol %:

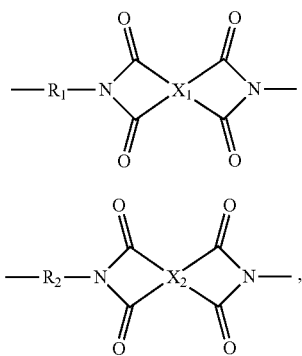

wherein $R_1$ represents a divalent group having from 6 to 22 carbon atoms comprising at least one alicyclic hydrocarbon structure; $R_2$, represents a divalent chain aliphatic group having from 5 to 16 carbon atoms; and $X_1$ and $X_2$ each independently represent a tetravalent group having from 6 to 22 carbon atoms comprising at least one aromatic ring, wherein the silica particles (B) are at least one selected from the group consisting of phenylsilane-treated silica particles and (meth)acrylsilane-treated silica particles, wherein a content of the silica particles (B) is from 0.05 to 10 parts by mass with respect to 100 parts by mass of the thermoplastic polyimide resin powder (A), wherein a total content of the thermoplastic polyimide resin powder (A) and the silica particles (B) is at least 90 mass %, and wherein the polyimide powder composition has an angle of repose of 30° or less as measured with a multifunctional apparatus for measuring powder physical properties.

2. The polyimide powder composition according to claim 1, wherein a volume average particle size D50 of the thermoplastic polyimide resin powder (A) is from 5 to 200 μm.

3. The polyimide powder composition according to claim 1, wherein a weight average molecular weight of the polyimide resin is from 10,000 to 150,000.

4. The polyimide powder composition according to claim 1, which is a molding material for a 3D printer.

5. The polyimide powder composition according to claim 1, which is a matrix resin material for a fiber-reinforced composite.

6. A molded article obtained by molding the polyimide Powder composition according to claim 1.

7. The polyimide powder composition according to claim 1, wherein the volume average particle size D50 of the silica particles (B) is from 5 nm to 60 nm.

8. The polyimide powder composition according to claim 1, wherein the silica particles (B) comprise phenylsilane-treated silica particles.

9. The polyimide powder composition according to claim 1, wherein the content of the silica particles (B) in the polyimide powder composition is from 0.2 to 3.0 parts by mass.

* * * * *